(12) United States Patent
Sugitatsu

(10) Patent No.: US 8,915,602 B2
(45) Date of Patent: Dec. 23, 2014

(54) OPTICAL MODULE

(75) Inventor: Atsushi Sugitatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 299 days.

(21) Appl. No.: 13/516,895

(22) PCT Filed: Dec. 18, 2009

(86) PCT No.: PCT/JP2009/071155
§ 371 (c)(1),
(2), (4) Date: Jun. 18, 2012

(87) PCT Pub. No.: WO2011/074117
PCT Pub. Date: Jun. 23, 2011

(65) Prior Publication Data
US 2012/0262900 A1    Oct. 18, 2012

(51) Int. Cl.
*F21V 9/14* (2006.01)
*G02B 6/42* (2006.01)

(52) U.S. Cl.
CPC ............ *G02B 6/4246* (2013.01); *G02B 6/4204* (2013.01); *G02B 6/4208* (2013.01); *G02B 6/4214* (2013.01); *G03B 6/4215* (2013.01)
USPC .............. 362/19; 362/231; 362/551; 362/553

(58) Field of Classification Search
USPC .................................... 362/19, 231, 551, 553
See application file for complete search history.

(56) References Cited

U.S. PATENT DOCUMENTS

| | | | |
|---|---|---|---|
| 6,055,102 A | * | 4/2000 | Park ......................... 359/484.03 |
| 6,493,121 B1 | | 12/2002 | Althaus |
| 7,361,884 B2 | | 4/2008 | Tanaka et al. |
| 2002/0085281 A1 | | 7/2002 | Dubin et al. |
| 2004/0075903 A1 | | 4/2004 | Dubin et al. |
| 2007/0122154 A1 | * | 5/2007 | Nakanishi et al. .............. 398/85 |

FOREIGN PATENT DOCUMENTS

| | | |
|---|---|---|
| JP | 3 144602 | 6/1991 |
| JP | 3 145606 | 6/1991 |
| JP | 8 160359 | 6/1996 |

(Continued)

OTHER PUBLICATIONS

Office Action issued Feb. 12, 2013 in Japanese Patent Application No. 2011-545916 (with partial English translation).

(Continued)

*Primary Examiner* — Sean Gramling
(74) *Attorney, Agent, or Firm* — Oblon, Spivak, McClelland, Maier & Neustadt, L.L.P.

(57) ABSTRACT

An optical module includes a casing, a first light output unit that is fixed to the casing and generates a first light signal, a second light output unit that is fixed to the casing while an angle thereof is set to be different from that of the first light output unit and generates a second light signal having a wavelength different from that of the first light signal, a first branching filter that refracts at least any one of the first light signal and the second light signal so that optical axes of the first light signal and the second light signal are partially overlapped, and one isolator that is located at a portion where optical axes of the first light signal and the second light signal are overlapped and performs isolation on the first light signal and the second light signal.

6 Claims, 7 Drawing Sheets

(56) References Cited

FOREIGN PATENT DOCUMENTS

| | | |
|---|---|---|
| JP | 2003-524789 | 8/2003 |
| JP | 2004-526189 | 8/2004 |
| JP | 2007 79074 | 3/2007 |
| JP | 2007 121987 | 5/2007 |
| JP | 2007 279614 | 10/2007 |
| JP | 2008 46315 | 2/2008 |
| JP | 2008 107760 | 5/2008 |
| JP | 2008 197459 | 8/2008 |
| JP | 2009-222893 A | 10/2009 |
| KR | 10-2006-0106475 | 10/2006 |

OTHER PUBLICATIONS

Office Action issued on Dec. 23, 2013 in the corresponding Chinese Patent Application No. 200980162984.0 (with partial English translation).

Korean Office Action issued Aug. 9, 2013, in Korea Patent Application No. 10-2012-7018671 (with English translation).

International Search Report Issued Mar. 16, 2010 in PCT/JP09/71155 Filed Dec. 18, 2009.

* cited by examiner

OPTICAL MODULE

FIELD

The present invention relates to an optical module that performs optical transmission and optical transmission/reception, in particular to an optical module including a plurality of light output units.

BACKGROUND

As for such an optical module including a plurality of light output units, it is a known technique that an isolator is arranged on each of individual light paths of laser diodes (hereinafter, LD) of the respective light output units. For example, in "optical transmission/reception module" in Patent Literature 1 discloses an example of an optical transmission and reception module, and in this conventional module, an isolator is arranged on a transmission light path (an LD light path) instead of arranging it on a reception light path. While there has been no optical module that is similar to this conventional module and includes a plurality of LDs with different wavelengths, as a usual idea, it is conceivable to mount an isolator individually on a plurality of LD light paths. That is, in an optical module including a plurality of light output units, an isolator is located individually on respective light paths that reach a common outgoing port (an optical fiber) from respective LDs. Particularly in an optical module with this configuration, because each of the LDs has a different wavelength to one another, loss may occur to some parts of isolators unless these isolators are individually optimized.

The isolator is explained. Normally in an LD, an outgoing light having a strong one-direction polarization property, which is known as TE (Transverse Electric) polarization (polarization having an electric field vector parallel to an active layer), is stably generated. However, there is a case where operations and properties of the LD become unstable when there is return light to the LD regardless of its polarization direction. Therefore, in order to stabilize operations and properties of the LD, an optical element referred to as "isolator" that blocks reflected return light to the LD while not blocking outgoing light from the laser diode is located between the LD and a portion that can be a reflected portion in a light path (normally, located between a fiber-incident end face and a laser diode). With this configuration, operations and properties of an optical module are stabilized.

CITATION LIST

Patent Literature

Patent Literature 1: Japanese Patent Application Laid-open No. 2007-121987

SUMMARY

Technical Problem

However, in the conventional technique described above, because isolators are located individually on respective LDs, the isolators, which are expensive, are required for the number of LDs. Therefore, there are problems of cost increase as well as increase of man-hour for assembling.

The present invention has been achieved in view of the above problems, and an object of the present invention is to provide a low-cost optical module having a simple configuration, while the number of isolators included in the optical module is reduced.

Solution to Problem

There is provided an optical module according to an aspect of the present invention including: a casing; a first light output unit that is fixed to the casing and generates a first light signal; a second light output unit that is fixed to the casing while an angle thereof is set to be different from that of the first light output unit and generates a second light signal having a wavelength different from that of the first light signal; a first branching filter that refracts at least any one of the first light signal and the second light signal so that optical axes of the first light signal and the second light signal are partially overlapped; and one isolator that is located at a portion where optical axes of the first light signal and the second light signal are overlapped and performs isolation on the first light signal and the second light signal.

Advantageous Effects of Invention

According to the present invention, it is possible to reduce the number of isolators, which are expensive, and thus a lower-cost optical module having a simple configuration can be achieved.

DESCRIPTION OF EMBODIMENTS

Exemplary embodiments of an optical module according to the present invention will be explained below in detail with reference to the accompanying drawings. The present invention is not limited to the embodiments.

First Embodiment

Figure 1:
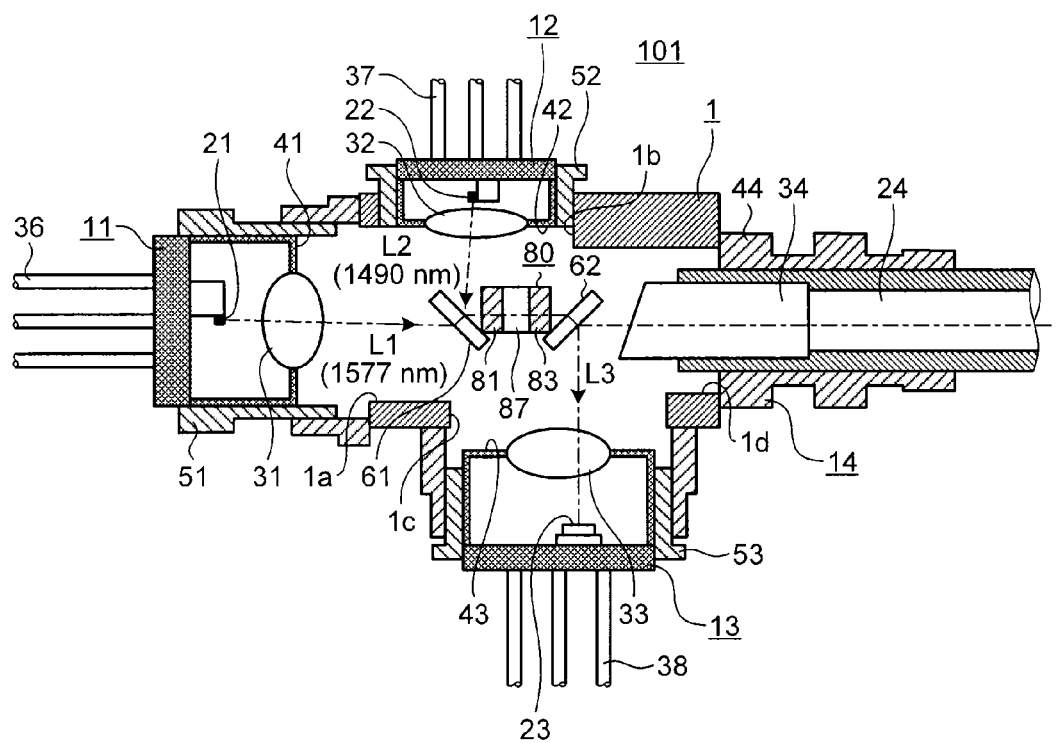
FIG. 1 is a vertical cross-sectional view of an optical module according to a first embodiment of the present invention.
Figure 2:
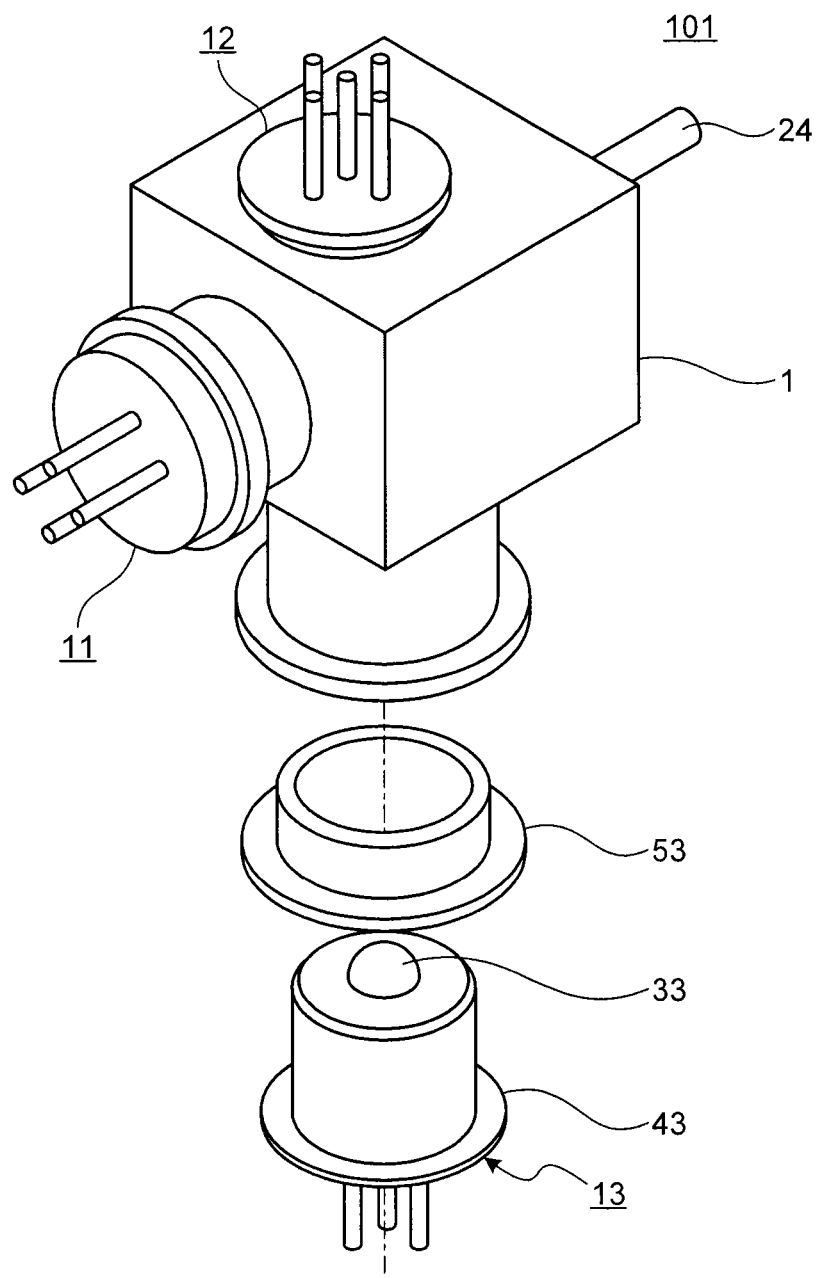
FIG. 2 is a partially exploded perspective view of the optical module according to the first embodiment of the present invention.

FIG. 1 is a vertical cross-sectional view of an optical module according to a first embodiment of the present invention. FIG. 2 is a partially exploded perspective view of the optical module according to the first embodiment of the present invention. In FIGS. 1 and 2, an optical module 101 according to the present embodiment is configured to include a casing 1 having a substantially box shape, and a first light output unit 11, a second light output unit 12, a light input unit 13, and an input/output port 14 that are respectively fixed in four mounting holes 1a, 1b, 1c, 1d formed in the casing 1.

The first light output unit 11, the second light output unit 12, and the light input unit 13 are respectively packaged in cylindrical bodies 41, 42, and 43 each having a bottomed cylindrical shape. The first light output unit 11 has incorporated therein a first laser diode (hereinafter, "first LD") 21 for transmission that is an optical element accommodated within the cylindrical body 41 and a lens 31 for light collection fixed in an end-face opening part of the cylindrical body 41. A bias is applied from outside to the first LD 21 through a lead pin 36, and the first LD 21 outputs a first light signal L1. Similarly, the second light output unit 12 has a second laser diode (hereinafter, "second LD") 22 for transmission and a lens 32 for light collection incorporated therein. A bias is applied from outside to the second LD 22 through a lead pin 37, and the second LD 22 outputs a second light signal L2 having a wavelength different from that of the first light signal L1.

Meanwhile, the light input unit 13 has incorporated therein a photodiode (hereinafter, PD) 23 for transmission that is an optical element accommodated within the cylindrical body 41 and a lens 33 for light collection supported by the cylindrical body 43. The lead pin 37 is connected to the PD 23, and the PD 23 converts a received third light signal L3 into an electrical signal and outputs the electrical signal from the lead pin 37.

The inside of the casing 1 is formed to be hollow, and a substantially central part of the casing 1 accommodates therein a first branching filter 61 and a second branching filter 62, each of which has a flat plate shape and constitutes an optical system. The first branching filter 61 and the second branching filter 62 are located such that principal surfaces of the filters form 90 degrees to each other, and these filters are supported by a mirror holder (not shown). As described above, the casing 1 has the four mounting holes 1a, 1b, 1c, 1d, which are separated from each other by substantially 90 degrees while centering around the first and second branching filters 61 and 62. The packaged first light output unit 11, second light output unit 12, and light input unit 13, and the input/output port 14 are respectively fixed in the mounting holes 1a, 1b, 1c, and 1d through slide structures 51, 52, and 53 for focus adjustment. In the input/output port 14, a supporting member 44 that supports a cable end of an optical fiber 24 causes a flange portion to abut against an outer surface of the casing 1 so as to insert a fiber ferrule 34 provided at a tip end of a cable into the mounting hole 1d, thereby connecting the optical fiber 24 to the casing 1.

In the present embodiment, an isolator 80 is arranged to be sandwiched by the first branching filter 61 and the second branching filter 62. As indicated by the dashed line in FIG. 1, after being output from the first LD 21, the first light signal L1 transmits through the first branching filter 61, passes through the isolator 80, transmits through the second branching filter 62, and then output to outside by the optical fiber 24. Furthermore, after being output from the second LD 22, the second light signal L2 is reflected by the first branching filter 61, passes through the isolator 80, transmits through the second branching filter 62, and then output to outside by the optical fiber 24. Meanwhile, the third light signal L3 transmitted from the optical fiber 24 is reflected by the second branching filter 62 and is input to the PD 23.

Figure 3:
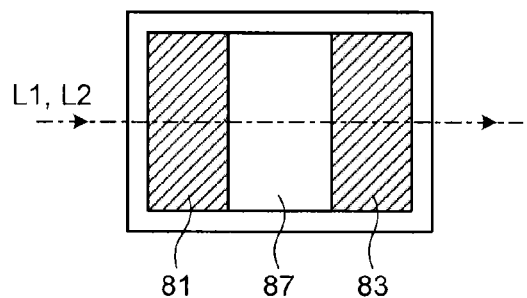
FIG. 3 is a schematic diagram of a configuration of an isolator.

FIG. 3 is a schematic diagram of a configuration of the isolator 80. The isolator 80 is configured such that a Faraday rotator 87 having a rotation angle of 45° is sandwiched by an incident-side polarizer 81 and an outgoing-side polarizer 83 transmission axes which are mutually inclined by an angle of 45°. The incident-side polarizer 81 and the outgoing-side polarizer 83 are formed by, for example, a birefringent crystal of a parallel flat plate. Furthermore, the Faraday rotator 87 includes a magnet that applies a magnetic field to the Faraday rotator 87. As shown in FIG. 3, for example, the first light signal L1 output from the first LD 21 transmits through the first branching filter 61 and then enters into the incident-side polarizer 81 from the left side of FIG. 3. Transmitted light having passed through the incident-side polarizer 81 passes through the Faraday rotator 87, and then passes through the outgoing-side polarizer 83, exits from the right side of FIG. 3, and enters into the optical fiber 24 through the second branching filter 62.

Figure 4:
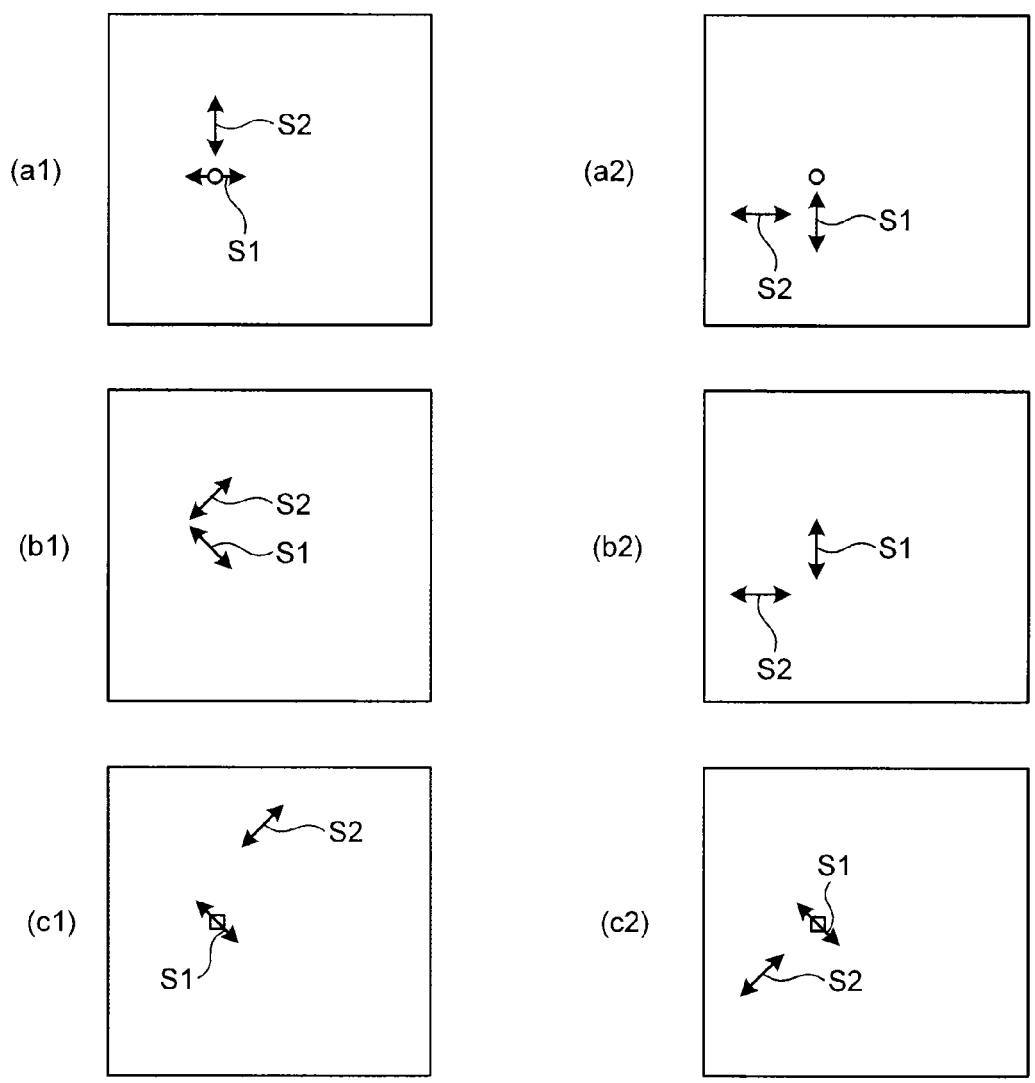
FIG. 4 depicts an operation of a case where a first light signal output from a first LD is propagated to an optical fiber.

Next, with reference to FIG. 4, a general operation of the isolator 80 is explained. FIG. 4 depicts an operation of a case where the first light signal L1 output from the first LD 21 is propagated to the optical fiber 24. In FIG. 4, (a1), (b1), and (c1) indicate directions of an electric field on a plain surface that is substantially vertical to an optical axis with respect to incident light to the optical fiber 24, and (a2), (b2), and (c2) indicate the above-described directions with respect to outgoing light from the optical fiber 24. Note that (a1) and (a2) indicate directions of an electric field of light after passing through the incident-side polarizer 81, (b1) and (b2) indicate directions of an electric field of light after passing through the Faraday rotator 87, and (c1) an (c2) indicate directions of an electric field of light after passing through the outgoing-side polarizer 83. Furthermore, in FIG. 4, circles (○) indicate an incident position of the first light signal L1, and squares (□) indicate a position of incident light from the optical fiber 24.

First, when non-polarized light is incident from the first branching filter 61, the light is separated into ordinary light S1 and extraordinary light S2 in the incident-side polarizer 81, and the light S1 and light S2 are respectively output from different positions at an output end of the incident-side polarizer 81 ((a1) in FIG. 4). In this case, the light at the position (○) at an incident position of the first light signal L1 is the ordinary light S1, and that shifted from the position of the incident position of the first light signal L1 is the extraordinary light S2.

Next, directions of the electric field of the ordinary light S1 and the extraordinary light S2 are rotated in the same direction by an angle of 45° by the Faraday rotator 87, and the light S1 and light S2 are input to the outgoing-side polarizer 83 ((b1) in FIG. 4). The ordinary light S1 and the extraordinary light S2 are further separated in the outgoing-side polarizer 83 and output from different positions. Therefore, by adjusting an optical axis of the optical fiber 24 (a position of the light input unit 11) with respect to required polarized light (the ordinary light S1 in this case), it is possible to pass only specific polarized light ((c1) in FIG. 4).

Reverse-direction propagation is explained next. In this explanation, a case of adjusting an optical axis (a position of the optical fiber 24) so that ordinary light can pass through in a forward direction is described. Light propagated from the optical fiber 24 to a reverse direction passes through the outgoing-side polarizer 83 and is separated into the ordinary light S1 and the extraordinary light S2 ((c2 in FIG. 4)). Subsequently, polarized light directions of the ordinary light S1 and the extraordinary light S2 are rotated in the same direction by an angle of 45° by the Faraday rotator 87, and the light S1 and light S2 are input to the incident-side polarizer 81 ((b2) in FIG. 4). The ordinary light S1 and the extraordinary light S2 are further separated in the incident-side polarizer 81 and output from different positions ((a2) in FIG. 4). As (a1) and (a2) in FIG. 4 are compared, it is understood that the optical isolator 80 separates only the ordinary light S1 to carry out incidence thereof, and that the isolator 80 effectively functions as an isolator without returning reverse direction light such as reflected light in the optical fiber 24 to the first branching filter 61.

A specific operation of the optical module 101 shown in FIG. 1 is explained next. In FIG. 1, the wavelength of the first light signal L1 generated from the first LD 21 is within a practically common range of 1577±10 nanometers. Meanwhile, the wavelength of the second light signal L2 generated from the second LD 22 is also within a practically common range of 1490±10 nanometers. The Faraday rotator 87 is optimized with respect to a wavelength of 1490 nanometers, and a polarization angle is rotated by 45° when the wavelength is 1490 nanometers. The incident-side polarizer 81 is a 0°-setting polarizer in which TM polarization and the transmitted polarization angle of the second LD match each other. The outgoing-side polarizer 83 is a 45°-setting polarizer. That is, between the incident-side polarizer 81 and the outgoing-side polarizer 83, there is set a polarization angle difference of 45 degrees.

Figure 5:
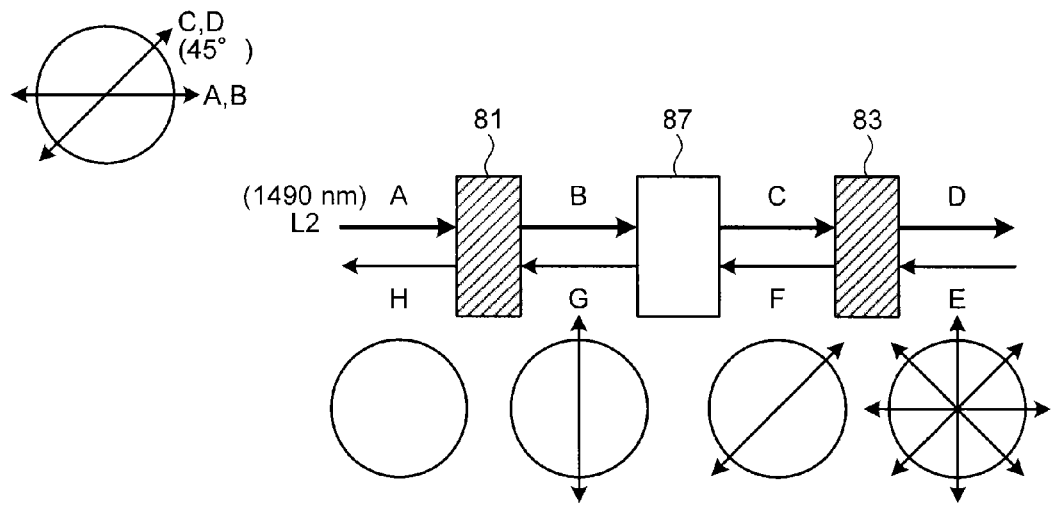
FIG. 5 is an explanatory diagram of a specific state where a polarization angle of a second light signal of the optical module shown in FIG. 1 transitions.

FIG. 5 is an explanatory diagram of a specific state where a polarization angle of the second light signal L2 (wavelength: 1490 nanometers) of the optical module 101 shown in FIG. 1 transitions. In FIG. 5, "A" represents a state before the second light signal L2 is input, "B" represents a state where the signal is output from the incident-side polarizer 81, "C" represents a state where the signal is output from the Faraday rotator 87, and "D" represents a state where the signal is output from the outgoing-side polarizer 83. "E" represents a state before return light from the optical fiber 24 is incident on the outgoing-side polarizer 83, "F" represents a state where the return light is output from the outgoing-side polarizer 83, "G" represents a state where the return light is output from the Faraday rotator 87, and "H" represents a state where the return light is output from the incident-side polarizer 81. In addition, angle diagrams of the polarization angle are also shown in FIG. 5 for easier understanding.

The second light signal L2 (wavelength: 1490 nanometers) generated from the second LD 22 is explained first. The second light signal L2 is input to the incident-side polarizer 81 (a state A). Because TE polarization and the transmitted polarization angle of the second LD 22 match each other in the incident-side polarizer 81, the second light signal L2 passes through the incident-side polarizer 81 without loss (a state B).

Subsequently, a polarization angle is rotated by 45° by the Faraday rotator 87 (a state C). At this time, because polarization angles of the second light signal L2 and the outgoing-side polarizer 83 match each other, the second light signal L21 passes through the outgoing-side polarizer 83 without loss (a state D). Accordingly, the second light signal L21 passes through the isolator 80 without loss and reaches the optical fiber 24. The second light signal L2 is then output to outside through the optical fiber 24.

Furthermore, reflected return light from the side of the optical fiber 24 is incident on the outgoing-side polarizer 83 (a state E). This reflected return light has random polarization angles (see the angle diagram of the polarization angle in the state E). Light other than a 45°-polarized light is blocked by the outgoing-side polarizer 83. The 45°-polarized light passes through the outgoing-side polarizer 83 (a state F) and is incident on the Faraday rotator 87. As the 45°-polarized light is rotated by further 45° by the Faraday rotator 87, the light having passed through the Faraday rotator 87 becomes 90°-polarized light (a state G). This 90°-polarized light is blocked by the incident-side polarizer 81. As a result, there is no reflected return light that passes through the incident-side polarizer 81 and returns to the side of the first light output unit 11 (a state H).

Figure 6:
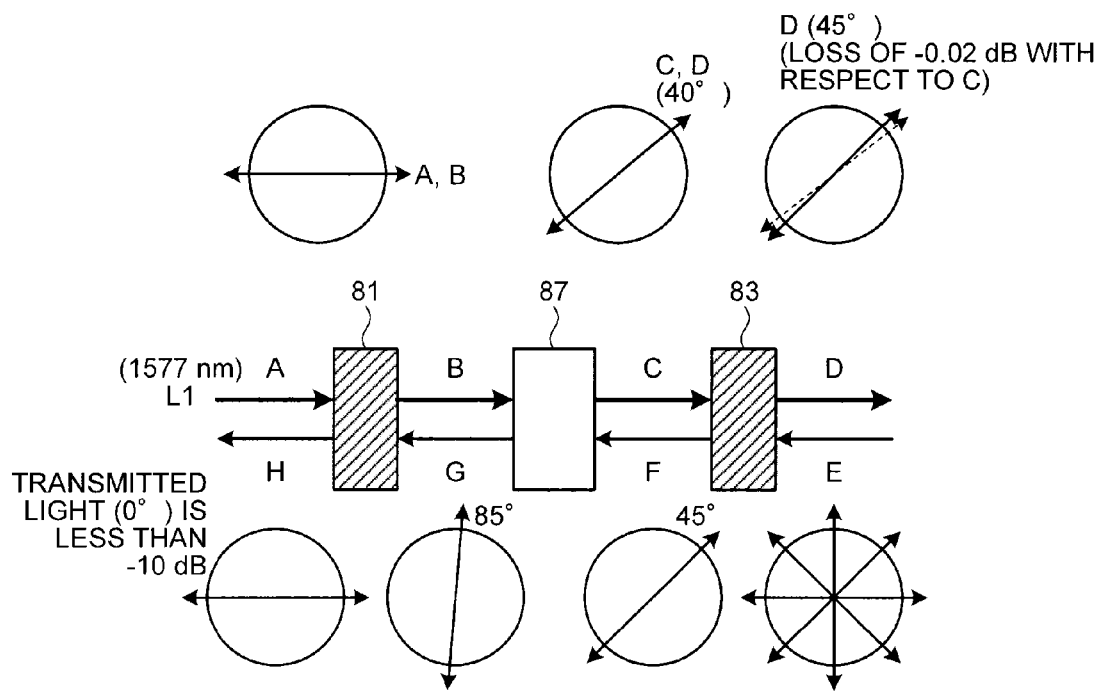
FIG. 6 is an explanatory diagram of a specific state where a polarization angle of the first light signal of the optical module shown in FIG. 1 transitions.

FIG. 6 is an explanatory diagram of a specific state where a polarization angle of the first light signal L1 (wavelength: 1577±10 nanometers) of the optical module 101 shown in FIG. 1 transitions. In FIG. 6, the wavelength of the first light signal L1 generated from the first LD 21 is different from that of the second light signal L2, and thus polarization rotation angles of these signals do not match each other in the Faraday rotator 87. Because the rotation angle of the Faraday rotator 87 is proportional to the square of a wavelength, the polarization rotation angle with respect to 1577 nanometers of the Faraday rotator 87 having a polarization rotation angle of 45° with respect to 1490 nanometers becomes 40° ($\cong 45 \times (1490/1577)^2$).

The first light signal L1 output from the first LD 21 is input to the incident-side polarizer 81 (a state A), passes through the incident-side polarizer 81 without loss (a state B), and the polarization angle of the signal is rotated only by 40° by the Faraday rotator 87 (a state C). Therefore, when passing through the outgoing-side polarizer 83, a loss is caused on the first light signal L1 and then it passes through the outgoing-side polarizer 83 (a state D). However, the loss is only 0.02 decibel.

Meanwhile, reflected return light from the side of the optical fiber 24 is incident on the outgoing-side polarizer 83 (a state E). As the reflected return light passes through the outgoing-side polarizer 83, only 45°-polarized light transmits through the outgoing-side polarizer 83 and light other than the 45°-polarized light is blocked (a state F). Subsequently, the polarization angle is rotated by 40° by the Faraday rotator 87, and the polarization angle of the reflected return light becomes 85° (a state G). Therefore, the light having transmitted through the incident-side polarizer 81 is attenuated to strength of less than −10 decibels as compared to the light before transmitting the incident-side polarizer 81 (a state H). While the reflected return light has various polarization angle components, a practically sufficient enough extinction ratio with respect to these polarization angle components can be ensured.

As described above, in the present embodiment, there is provided one isolator 80 that is located at a portion where optical axes of the first light signal L1 and the second light signal L2 are overlapped and performs isolation on the first light signal L1 and the second light signal L2. Therefore, the number of the isolators 80, which are expensive, can be reduced, and thus a low-cost optical module having a simple configuration can be realized.

Furthermore, the isolator 80 is constituted by the incident-side polarizer 81 that causes the first light signal L1 and the second light signal L2 to transmit using a polarization transmission characteristic of a first polarization wave direction, the Faraday rotator 87 that has transmitted light from the incident-side polarizer 81 incident thereon, rotates polarized light of the transmitted light only by a first angle (45°) around an optical axis, and then outputs the transmitted light, and the outgoing-side polarizer 83 that has a polarization transmission characteristic in a direction of a second polarization wave direction, which is rotated by the first angle (45°) from the first polarization wave direction, and outputs the transmitted light having passed through the Faraday rotator 87 using the polarization transmission characteristic of the second polarization wave direction. Therefore, return light to be incident from the outgoing-side polarizer 83 can be effectively attenuated.

Further, the second branching filter 62 that refracts the third light signal L3 input from the input/output port 14, to which a light signal from the optical fiber 24 is input, towards the light input unit 11 is arranged between the isolator 80 and the input/output port 14. Therefore, the light signal from the fiber 24 can reach the light input unit 11 without loss. In addition, in an optical module including two or more LDs and two or more PDs, an isolator located on a light path common to the LDs is installed so as not to be located on light paths between the PDs and a fiber, in a state where all the light paths between the PDs and the fiber are located on a fiber side.

In the present embodiment, the rotation angle of the Faraday rotator 87 is adapted to the angle of the first light signal L1 output from the first LD 21. Specifically, the rotation angle of the Faraday rotator 87 is set as a polarization rotation angle of 45° with respect to a wavelength of 1490 nanometers. However, the setting of the Faraday rotator 87 is not limited thereto. In order to perform isolation equally with respect to both wavelengths of the first light signal L1 (wavelength: 1577 nanometers) and the second light signal L2 (wavelength: 1490 nanometers), it is possible to set the rotation angle of the Faraday rotator 87 to be adapted to an intermediate value of the both wavelengths of the first light signal L1 and the second light signal L2, particularly as a central value therebetween.

Furthermore, when the characteristic degradation tolerance with respect to reflected return light of the first LD 21 and that with respect to reflected return light of the second LD 22 are different, it suffices to set the rotation angle of the Faraday rotator 87 so that isolation with respect to one of the LDs having inferior characteristic degradation tolerance is set greater.

In a case of an optical module including three or more light output units (a case of including three or more LDs), the number of isolators used for the optical module can be reduced by one when locating an isolator on a common light path between two LDs, and the number of the isolators can be reduced by two when inserting an isolator in a common light path between three LDs. In this manner, it is possible to design an optical module including a reduced number of isolators according to its light path configuration. When "n" laser diodes are integrated, it is possible to reduce the number of isolators by up to "n−1". Furthermore, an isolator inserted in a common light path is constituted such that the polarization rotation angle of the Faraday rotator 87 is set to be 45° between a maximum wavelength and a minimum wavelength of a laser diode that is connected to the common light path.

Second Embodiment

Figure 7:
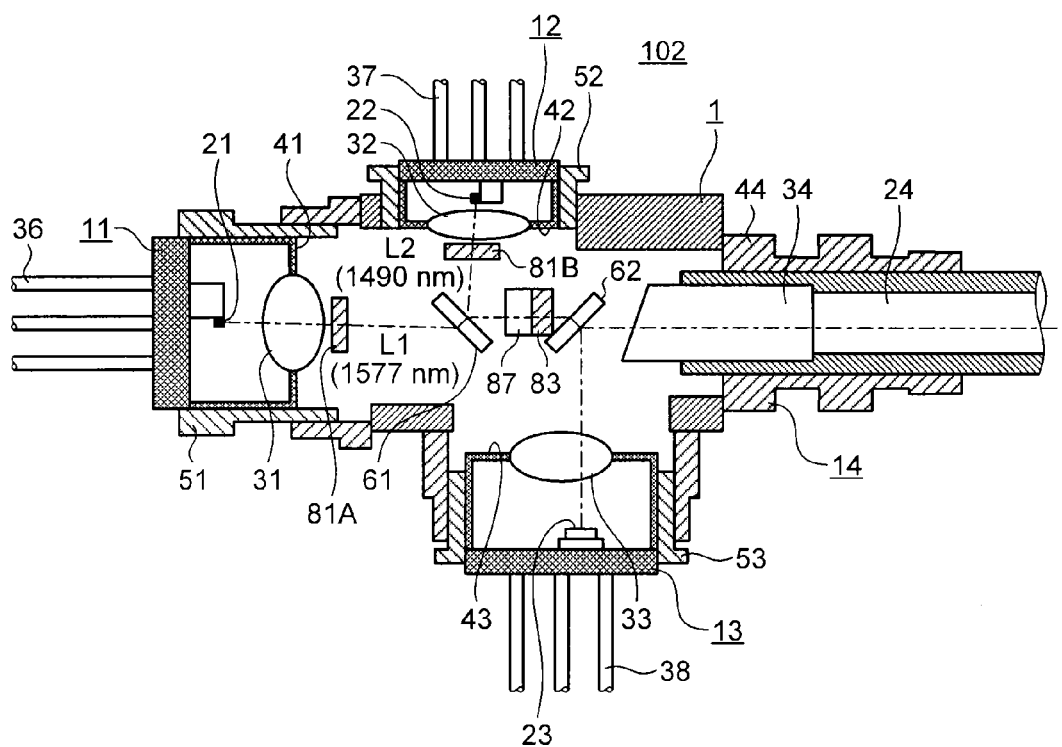
FIG. 7 is a vertical cross-sectional view of an optical module according to a second embodiment of the present invention.

FIG. 7 is a vertical cross-sectional view of an optical module according to a second embodiment of the present invention. In an optical module 102 according to the second embodiment, the incident-side polarizer 81 in which the function of the isolator 80 is disintegrated and separated from the Faraday rotator 87 is divided into two polarizers, which are a first incident-side polarizer 81A and a second incident-side polarizer 81B that are provided in the first light output unit 11 and the second light output unit 12, respectively. In this case, the Faraday rotator 87 and the outgoing-side polarizer 83 remained between the first branching filter 61 and the second branching filter 62 are regarded as main isolators, and the divided first incident-side polarizer 81A and second incident-side polarizer 81B are regarded as first and second sub-isolators, respectively.

The first incident-side polarizer 81A and the second incident-side polarizer 81B are respectively located near the lens 31 of the first light output unit 11 and the lens 32 of the second light output unit 12, and are respectively supported by the cylindrical body 41 and the cylindrical body 42 using a stay (not shown).

Because the angle to be rotated by the Faraday rotator 87 is different according to the wavelength (the first light output unit 11: 1577±10 nanometers, the second light output unit 12: 1490±10 nanometers) ($40°(\cong 45\times(1490/1577)^2)$, 45°), angles of a polarizer and an LD provided in front of the respective light output units are set to be respectively corresponding angles.

A specific isolation operation is explained. By setting the second incident-side polarizer 81B as a 0°-setting polarizer and the outgoing-side polarizer 83 as a 45°-setting polarizer with respect to the second light signal L2 (wavelength: 1490 nanometers) of the second LD 22, an isolation operation identical to that shown in FIG. 5 can be realized.

Meanwhile, as for the first light signal L1 (wavelength: 1577 nanometers) of the first LD 21, the first incident-side polarizer 81A is set as a −5°-setting polarizer, thereby matching TE polarization wave of the first light signal L1.

Figure 8:
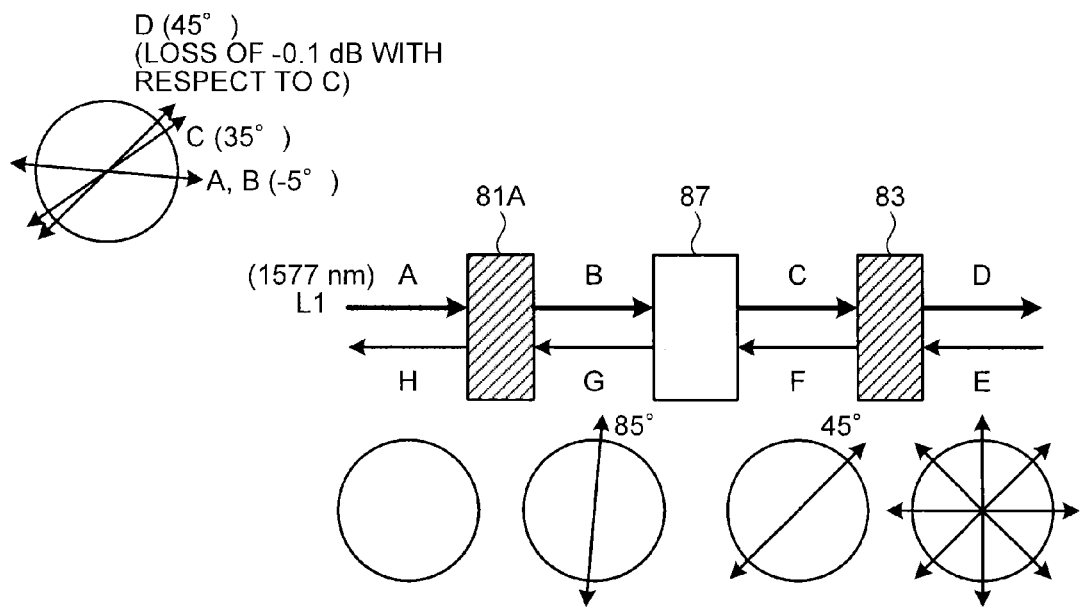
FIG. 8 is an explanatory diagram of a specific state where a polarization angle of a first light signal of the optical module shown in FIG. 7 transitions (a case where TE polarization wave of the first LD is arranged to match a polarization angle of −5°).

FIG. 8 is an explanatory diagram of a specific state where a polarization angle of the first light signal L1 (wavelength: 1577 nanometers) of the optical module 102 shown in FIG. 7 transitions. The first LD 21 is located such that TE polarization wave matches the polarization angle of a −5°-setting polarizer. The first light signal L1 output from the first LD 21 is input to the first incident-side polarizer 81A (a state A). The first light signal L1 transmits through the first incident-side polarizer 81A without loss of a −5° angle component (a state B). A polarization angle is rotated by 40° by the Faraday rotator 87, and thus the polarization angle of transmitted light becomes 35° (a state C). Because the outgoing-side polarizer 83 is a 45°-setting polarizer, the first light signal L1 is output with a loss of only −0.1 decibel (a state D).

On the contrary, reflected return light from the side of the optical fiber 24 is incident on the outgoing-side polarizer 83 (a state E). As the reflected return light passes through the outgoing-side polarizer 83, only 45°-polarized light transmits through the outgoing-side polarizer 83 and light other than the 45°-polarized light is blocked (a state F). Subsequently, the polarization angle is rotated by 40° by the Faraday rotator 87, and the polarization angle of the reflected return light becomes 85° (a state G). Because the first incident-side polarizer 81A is a −5°-setting polarizer, the entire transmitted light is blocked by the first incident-side polarizer 81A and cannot transmit through it (a state H).

As described above, in the present embodiment, the first incident-side polarizer 81A (the first sub-isolator) arranged between the first light output unit 11 and the first branching filter 61, the second incident-side polarizer 81B (the second sub-isolator) arranged between the second light output unit 12 and the first branching filter 61, and the Faraday rotator 87 and the outgoing-side polarizer 83 (main isolators) that are located at a portion where optical axes of the first light signal and the second light signal are overlapped, perform isolation on the first light signal in cooperation with the first incident-side polarizer 81A, and perform isolation on the second light signal in cooperation with the second incident-side polarizer 81B are provided. Therefore, the number of the isolators 80, which are expensive, can be reduced, and thus a low-cost optical module having a simple configuration can be realized.

Furthermore, the first incident-side polarizer 81A that constitutes a sub-isolator is a first incident-side polarizer 81A having a polarization transmission characteristic of a polarization wave direction, where the polarization angle matches TE polarization wave of a light-emitting element of the first light output unit 11. The second incident-side polarizer 81B is a second incident-side polarizer 81B having a polarization transmission characteristic of a polarization wave direction, where the polarization angle matches TE polarization wave of a light-emitting element of the second light output unit 12. The main isolator is constituted by the Faraday rotator 87 that rotates polarized light of the first light signal L1 and polarized light of the second light signal L2 by a first angle) (45° around an optical axis and outputs the polarized light, and the outgoing-side polarizer 83 that has a polarization transmission characteristic in a direction of a second polarization wave direction, which is obtained by rotating the first light signal L1 and the second light signal L2 by the first angle (45°) from a polarization wave direction that corresponds to the first light signal L1 or the second light signal L2, and that outputs transmitted light having passed through the Faraday rotator 87 using the polarization transmission characteristic of the second polarization wave direction. Therefore, it is possible to realize a favorable isolation operation.

Figure 9:
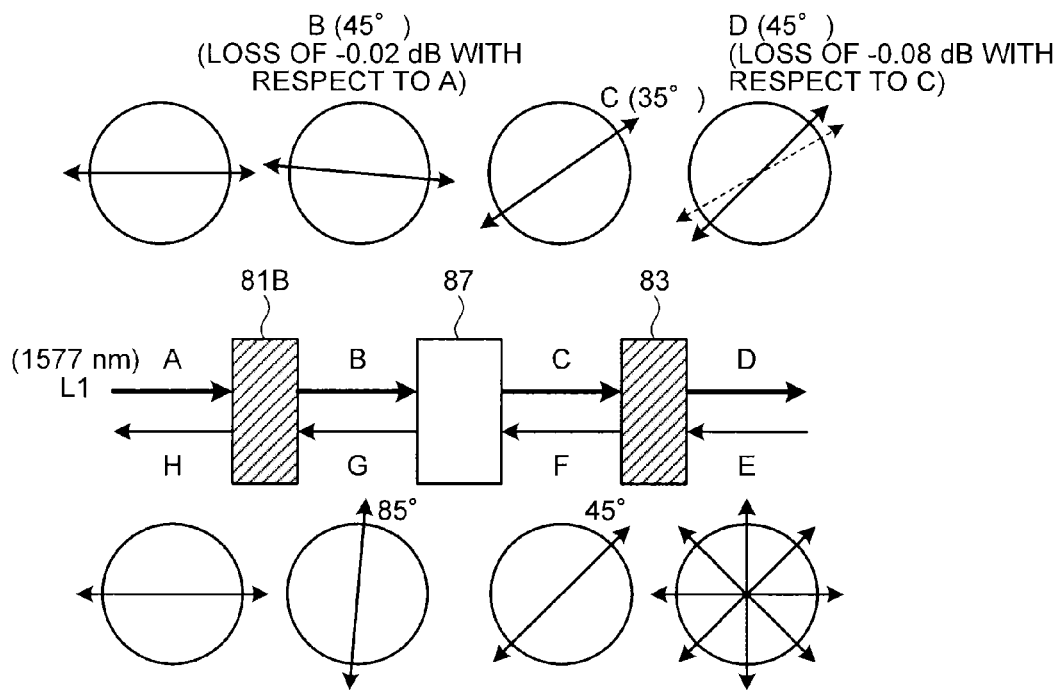
FIG. 9 is an explanatory diagram of a specific state where a polarization angle of a first light signal of the optical module shown in FIG. 7 transitions (a case where TE polarization wave of the first LD is arranged to match a polarization angle of 0°).

In the present embodiment, the first LD 21 is located such that TE polarization wave matches the polarization angle of a −5°-setting polarizer. In a case where the first LD 21 is located such that the TE polarization wave matches a polarization angle of 0°, as shown in FIG. 9, when the first light signal L1 transmits from a state A to a state B and from a state C to a state D, a loss of −0.02 decibel and of −0.08 decibel is caused, respectively; however, the loss is only −0.1 decibel even if these numbers are added, and the loss causes no influence because it is only within a margin of error.

While an example where the Faraday rotator 87 becomes optimum for the second LD 22 has been explained in the first embodiment, as described above, by setting such that a polarization angle rotated by the Faraday rotator 87 is 45° in a wavelength between a minimum wavelength and a maximum wavelength in an LD within a system and by setting an appropriate rotation angle of a polarizer according to the above example, the loss distribution can be appropriately set in a range in which the first LD 21 and the second LD 22 are put in a practical use, and thus appropriate isolation can be ensured.

Third Embodiment

Figure 10:
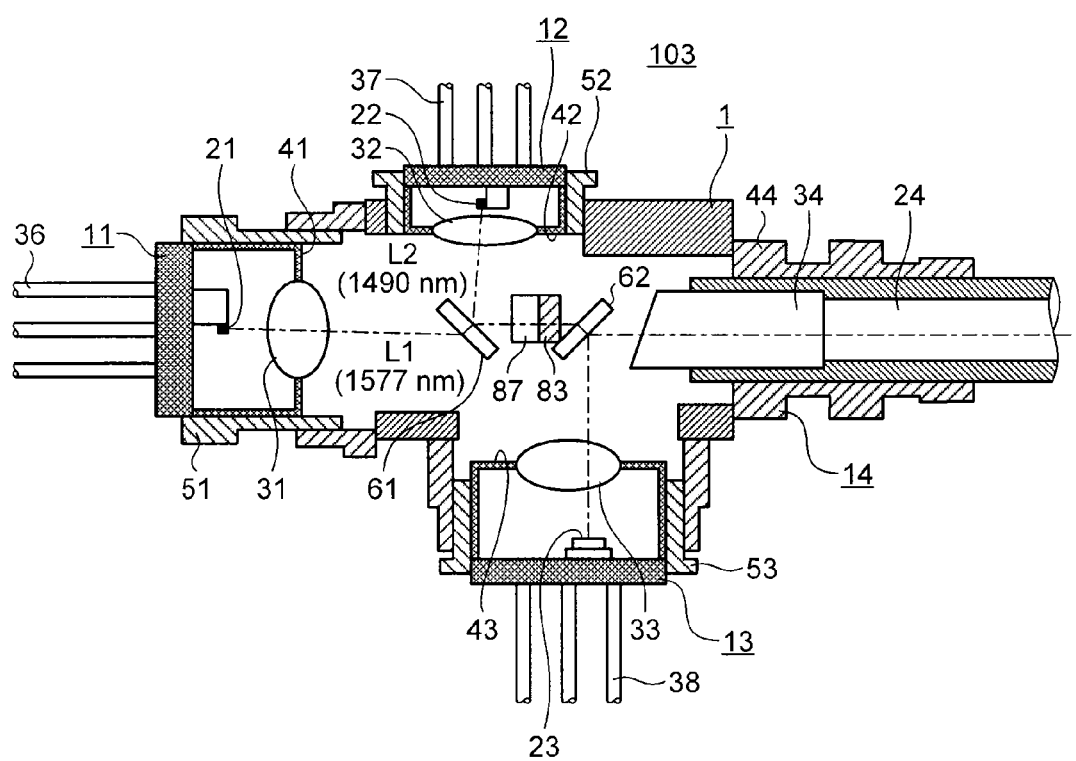
FIG. 10 is a vertical cross-sectional view of an optical module according to a third embodiment of the present invention.

FIG. 10 is a vertical cross-sectional view of an optical module according to a third embodiment of the present invention. As compared to the optical module according to the second embodiment shown in FIG. 7, in an optical module 103 according to the present embodiment, the first incident-side polarizer 81A and the second incident-side polarizer 81B are omitted. Similarly to the above embodiments, when the Faraday rotator 87 is optimized to rotate a polarization angle by 45° with respect to the wavelength of the second LD 22, TE polarization angles of the first LD 21 and the second LD 22 are caused to match a polarization angle of 0°, and the outgoing-side polarizer 83 is set to be a 45°-setting polarizer. Outgoing light of the second LD 22 has no loss. Outgoing light of the first LD 21 has a loss of −0.02 decibel.

Meanwhile, reflected return light returns to the second LD 22 as TM polarization (polarization angle of 90°), and returns to the first LD 21 in a state of being close to TM polarization (polarization angle of 85°). Although it depends on the internal configuration thereof, a laser diode normally performs laser oscillation in TE polarization wave. Therefore, the laser diode is easily influenced by return light of TE polarization wave, but is less influenced by TM polarization wave. Because normally the polarization state of reflected return light is that of random polarization as represented by the state E, along with a fact that the reflected return light is attenuated by the polarizer to be light having a single polarization angle, it is possible to perform isolation corresponding to a TM polarization wave tolerant characteristic of the laser diode.

INDUSTRIAL APPLICABILITY

As described above, the optical module according to the present invention is, for example, suitable for an optical module used for an optical transmission/reception device that performs optical transmission/reception.

REFERENCE SIGNS LIST

1 CASING
1a, 1b, 1c, 1d MOUNTING HOLE
11 FIRST LIGHT OUTPUT UNIT
12 SECOND LIGHT OUTPUT UNIT
13 LIGHT INPUT UNIT
14 INPUT/OUTPUT PORT
21 FIRST LASER DIODE
22 SECOND LASER DIODE
23 PHOTODIODE
24 OPTICAL FIBER
31, 32, 33 LENS
34 FIBER FERRULE
36, 37, 38 LEAD PIN
41, 42, 43 CYLINDRICAL BODY
44 SUPPORTING MEMBER
51, 52, 53 SLIDE STRUCTURE
61 FIRST BRANCHING FILTER
62 SECOND BRANCHING FILTER
80 ISOLATOR
81 INCIDENT-SIDE POLARIZER
81A FIRST INCIDENT-SIDE POLARIZER
81B SECOND INCIDENT-SIDE POLARIZER
83 OUTGOING-SIDE POLARIZER
87 FARADAY ROTATOR (ROTATOR)
L1 FIRST LIGHT SIGNAL
L2 SECOND LIGHT SIGNAL
L3 THIRD LIGHT SIGNAL
101, 102, 103 OPTICAL MODULE

The invention claimed is:
1. An optical module comprising:
a casing;
a first light output unit that is fixed to the casing and generates a first light signal;
a second light output unit that is fixed to the casing while an angle thereof is set to be different from that of the first light output unit and generates a second light signal having a wavelength different from that of the first light signal;
a first branching filter that refracts at least any one of the first light signal and the second light signal so that opti- cal axes of the first light signal and the second light signal are partially overlapped;

a first incident-side polarizer arranged between the first light output unit and the first branching filter;

a second sub-isolator arranged between the second light output unit and the first branching filter; and one main isolator that is located at a portion where optical axes of the first light signal and the second light signal are overlapped, performs isolation on the first light signal in cooperation with the first incident-side polarizer, and performs isolation on the second light signal in cooperation with the second sub-isolator.

2. The optical module according to claim 1, wherein the first incident-side polarizer is a first incident-side polarizer having a polarization transmission characteristic of a polarization wave direction, where a polarization angle matches TE polarization of a light-emitting element of the first light output unit, the second sub-isolator is a second incident-side polarizer having a polarization transmission characteristic of a polarization wave direction, where a polarization angle matches TE polarization of a light-emitting element of the second light output unit, and the main isolator includes:

a Faraday rotator that rotates polarized light of the first light signal and polarized light of the second light signal by a first angle around an optical axis and outputs the polarized light, and an outgoing-side polarizer that has a polarization transmission characteristic in a direction of a second polarization wave direction, which is obtained by rotating the first light signal L1 and the second light signal L2 by the first angle from a polarization wave direction that corresponds to the first light signal or the second light signal, and that outputs transmitted light having passed through the Faraday rotator using a polarization transmission characteristic of the second polarization direction.

3. The optical module according to claim 2, wherein the first angle as a polarization rotation angle of the Faraday rotator is 45°.

4. The optical module according to claim 2, wherein the incident-side polarizer, the Faraday rotator, and the outgoing-side polarizer are integrated as the one isolator provided between the first branching filter and the second branching filter.

5. The optical module according to claim 3, wherein a polarization rotation angle of the Faraday rotator is 45° with respect to any one of a wavelength of the first light signal or a wavelength of the second light signal.

6. The optical module according to claim 3, wherein a polarization rotation angle of the Faraday rotator is 45° with respect to an intermediate wavelength of the first light signal or the second light signal.

* * * * *